W. A. TURBAYNE.
ELECTRICAL SYSTEM OF REGULATION.
APPLICATION FILED APR. 29, 1911.
1,197,160.
Patented Sept. 5, 1916.
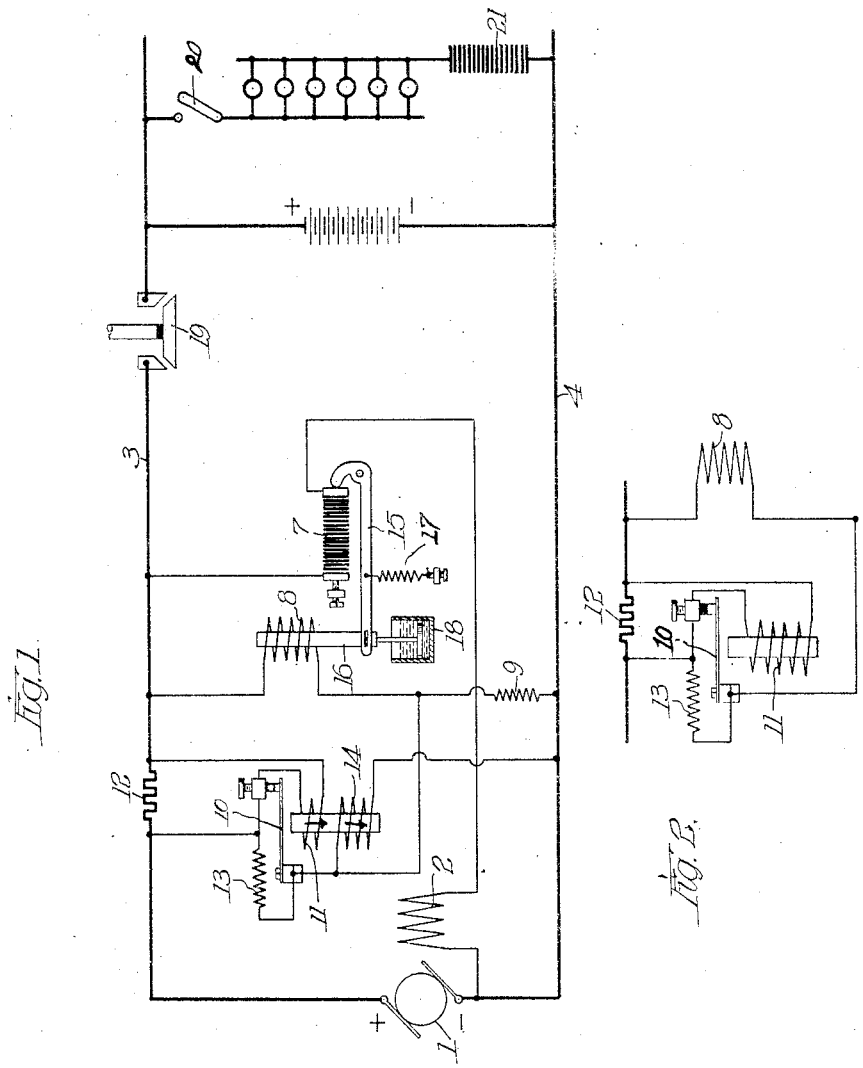
Witnesses:
Robert H. Weir
Geo. B. Gould
Inventor
William A. Turbayne
Edwin B. H. Tower, Jr.
Atty.

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

ELECTRICAL SYSTEM OF REGULATION.

1,197,160.

Specification of Letters Patent. Patented Sept. 5, 1916.

Application filed April 29, 1911. Serial No. 624,141.

*To all whom it may concern:*

Be it known that I, WILLIAM A. TURBAYNE, a citizen of the United States, residing at Niagara Falls, in the county of Niagara and State of New York, have invented new and useful Improvements in Electrical Systems of Regulation, of which the following is a full, clear, concise, and exact description, reference being had to the accompanying drawing, forming a part of this specification.

My invention relates to an electrical regulator and to a system employing such a regulator.

One of the objects of the invention is to provide a regulator adapted to maintain substantially constant the generator current delivered to the external circuit.

Another object is to provide means for regulating the generator voltage so that the charging current furnished to the storage battery forming a part of the system, will become decidedly reduced as the battery approaches a fully charged condition.

Another object is to provide a regulator which will be very sensitive in operation.

The invention may be embodied in various forms. In the accompanying drawings I have illustrated a car lighting system having a regulator which embodies the main features of the invention. The regulator may, of course, assume other forms and may be employed in other systems.

In the drawings:—Figure 1 illustrates diagrammatically, the car lighting system referred to. Fig. 2 illustrates diagrammatically, a modified form of regulator from that shown in Fig. 1.

In the system illustrated, an axle-driven generator is shown, having an armature 1 and a shunt field winding 2. The generator supplies the external circuit 3, 4, across which the storage battery 5 and lamp circuit 6 are connected in parallel branches. The generator field strength, and consequently the generator output, is controlled by a variable resistance 7 which is illustrated as being a variable pressure rheostat comprising contacting resistance plates. The pressure on the series of plates determines the resistance of the generator field circuit. The pressure is controlled by the controlling winding 8 connected in series with the resistance 9 across the generator terminals and, therefore, responsive to generator voltage.

The controlling winding 8 is normally short-circuited by a contact carried by the resilient reed 10. This reed is adapted to vibrate rapidly and thereby rapidly make and break the short circuit around the controlling winding 8. The vibration of the reed 10 is effected by the operating winding 11 which is connected as a shunt across the resistance 12 connected in series in the external circuit. The coil 11 will be subject to current variations proportionate to the current delivered by the generator. A resistance 13 is connected across the contacts to reduce the sparking when the reed is vibrating. The potential winding 14 acts accumulatively with the winding 11 and is connected across the generator terminals through the resistance 13. It is, therefore, subjected to the generator voltage.

The mechanical connections between the resistance 7 and the winding 8 include the bell crank lever 15 attached to the plunger 16. The core is normally in its lowermost position, due to its weight, which may be assisted by a spring 17, if desired. The pressure on the resistance blocks 7 is, therefore, normally a maximum, hence the generator field resistance is normally a minimum. A dash-pot 18 is provided to steady the action of the plunger and associated parts, and thereby prevent sudden fluctuations in the generator field resistance.

An automatic switch 19, which may be of any suitable type, is connected in the external circuit between the regulator and the storage battery. Any suitable switch 20 may be used to open and close the lamp circuit, the voltage of which may be confined within proper limits by any suitable regulator 21.

The regulator illustrated in Fig. 2 is the same as that illustrated in Fig. 1 except that the potential winding is omitted. In this form of regulator, therefore, which is adapted for constant current regulation, the magnetization of the relay core is effected solely by the energization of the coil 11.

I will consider first the system as operating to maintain constant current. When the generator armature begins to rotate, the field strength builds up rapidly and the voltage rises with the speed until the battery voltage is equaled or slightly exceeded by the generator voltage, whereupon the automatic switch closes and the generator carries the lamp load and charges the battery. The regulator shown in Fig. 2 has its vibratile reed so adjusted that the normal predetermined desired current value of the system will not cause its attraction. If this predetermined current value is exceeded, the energization of the winding 11 caused by current proportional to the current in the external circuit, will cause the reed to be drawn down, thereby opening the short circuit around the controlling winding 8. The controlling winding is immediately energized and lifts its plunger to insert resistance into the generator field circuit. This action tends to reduce the generator output to the desired normal, whereupon the reed is permitted to spring back to again short-circuit the winding 8. This action will be repeated at a very high rate of speed, so that the effective current admitted to the controlling winding 8 will, at any speed of the generator, be just sufficient to insure the insertion of the proper value of resistance in the generator field circuit to maintain the proper generator current output.

The winding 11 and the corresponding resistance 12 are located in the main external circuit in order that said winding may tend to regulate for constant generator current. It is obvious, however, that said winding and said resistance may be otherwise located where it is desired to regulate for constant current in the battery branch.

The regulator illustrated in Fig. 1 includes the potential coil 14 previously described. In this case the current-responsive winding 11 will consist simply of a few turns. The potential winding 14 gives the predominating magnetizing effect, the winding 11 acting simply as a modifying coil, as hereinafter described. The potential winding 14 acting alone would tend to regulate the generator so as to maintain its terminal voltage at a value sufficiently high to furnish a charging current to the battery against the maximum counter-electro-motive force thereof. This generator voltage might be altogether too high to impress across the battery in a more or less depleted condition. Hence the few turns of the winding 11 in the same direction as the winding 14 act to modify the regulation so as to reduce the regulator voltage sufficiently to prevent an abnormal charging current from being delivered to the battery. This is effected by a modification in the vibration of the reed 10 in such a manner that the effective energization of the winding 8 is increased, whereupon the resistance 7 is increased to weaken the generator field.

As the counter-electro-motive force of the battery rises during the charging process, the current entering the same will fall off decidedly in value until when a substantially fully charged condition is obtained, the battery charging current will be practically suppressed or reduced to the minimum value required to maintain the battery counter-electro-motive force at a voltage substantially equaling the predetermined voltage. This predetermined voltage is the voltage across the generator terminals determined by the voltage winding 14. It is apparent that even if the external circuit is open, the generator voltage cannot rise above this predetermined voltage.

It will be noticed that the potential coil 14 is connected directly across the generator terminals when the relay contacts are closed. When the contacts are open, the resistance 13 is included in the branch circuit containing the winding 14, so that at such periods a decided reduction in the effectiveness of the winding 14 is obtained, whereby the reed 10 instantaneously springs back to initial position. A very high rate of vibration is thereby effected, the resistance 13 also acting to suppress the tendency toward sparking at the contacts as in the previous case.

As shown in Fig. 1 both the potential winding 14 and the current winding 11 are mounted as part of the same regulator. Therefore, said potential winding may be connected in circuit as part of the regulator or it may be disconnected therefrom whereby one regulator may be used for both systems of regulation described above.

I do not desire to limit myself to the above embodiments of my invention, but desire to include any suitable equivalent means for accomplishing the desired results and falling within the scope of the appended claims.

I claim as my invention,

1. A system of electrical regulation comprising a generator having a shunt field winding, an external circuit for said generator, a variable resistance in the generator field circuit for varying the generator output and means for controlling said resistance, said means including a controlling winding connected across the generator terminals, and a vibratory relay normally short circuiting said controlling winding.

2. A system of electrical regulation comprising a generator having a shunt field winding, an external circuit for said generator, a variable resistance in the generator field circuit for varying the generator output and means for controlling said resistance, said means including a controlling winding connected across the generator terminals, and a current responsive vibratory relay normally short circuiting said controlling winding, but adapted upon predetermined current increase to rapidly vibrate to permit the energization of said controlling winding for the purpose of reducing the generator current output.

3. A system of electrical regulation comprising a generator having a shunt field winding, an external circuit for said generator, a variable resistance in the generator field circuit for varying the generator voltage, and means for controlling said resistance, said means including a controlling winding connected across the generator terminals, a member normally short circuiting said controlling winding, but adapted to vibrate rapidly to permit the energization of said controlling winding and a potential coil connected across the generator terminals to regulate said vibrations.

4. A system of electrical regulation comprising a generator having a shunt field winding, an external circuit for said generator, a variable resistance in the generator field circuit for regulating generator voltage and means for controlling said resistance, said means including a controlling winding connected across the generator terminals, a resilient reed normally closing a short circuit around said controlling winding, a voltage responsive winding adapted to cause the attraction of said reed to open said short circuit and to vibrate said reed rapidly, and a current responsive winding adapted to act cumulatively with said potential winding to reduce the generator current as the current in said current responsive coils tends to increase above a predetermined value.

5. A system of electrical regulation comprising a generator having a shunt field winding, an external circuit supplied by said generator, a storage battery and lamp circuit connected across said external circuit in parallel branches, a variable pressure rheostat connected in series with the generator shunt field winding to regulate the generator output, a controlling winding for controlling the pressure on said variable pressure rheostat, a resilient reed normally short circuiting said controlling winding to render the same inert, a voltage responsive winding adapted upon predetermined voltage increase of the generator to cause vibration of said reed for the purpose of energizing said controlling winding, to hold the generator voltage at a predetermined value, and a current responsive winding acting cumulatively with said voltage responsive winding to modify the vibrations of said reed, whereby the energization of said current responsive winding is increased when an abnormal charging current tends to be delivered to said battery whereby said variable pressure rheostat is operated to reduce the generator output and hence the battery charging current.

6. A regulator for a variable speed generator comprising a resilient reed for normally short circuiting a controlling winding, said reed being adapted to vibrate rapidly to make and break said short circuit, a high resistance connected across the make-and-break contacts, a current responsive coil and a voltage responsive coil, each adapted when energized, to cause vibration of said reed, said voltage coil being connected in series with said make-and-break contacts, whereby said coil is substantially open circuited when said short circuiting contacts are separated, whereby the energization of said coil is rapidly reduced to effect a high rate of vibration of said resilient reed.

In witness whereof, I have hereunto subscribed my name in the presence of two witnesses.

WILLIAM A. TURBAYNE.

Witnesses:
 Geo. B. Jones,
 Max M. Oppenheim.